(12) United States Patent
Che et al.

(10) Patent No.: US 10,748,017 B2
(45) Date of Patent: Aug. 18, 2020

(54) PALM VEIN IDENTIFICATION METHOD AND DEVICE

(71) Applicant: XIAMEN ZKTECO INFORMATION TECHNOLOGY CO., LTD., Fujian (CN)

(72) Inventors: Quanhong Che, Beijing (CN); Shukai Chen, Beijing (CN)

(73) Assignee: ZKTECO CO., LTD., Guangdong (CN)

( * ) Notice: Subject to any disclaimer, the term of this patent is extended or adjusted under 35 U.S.C. 154(b) by 100 days.

(21) Appl. No.: 15/778,674

(22) PCT Filed: Nov. 24, 2015

(86) PCT No.: PCT/CN2015/095436
§ 371 (c)(1),
(2) Date: May 24, 2018

(87) PCT Pub. No.: WO2017/088109
PCT Pub. Date: Jun. 1, 2017

(65) Prior Publication Data
US 2018/0357499 A1 Dec. 13, 2018

(51) Int. Cl.
*G06K 9/00* (2006.01)
*G06K 9/46* (2006.01)
(Continued)

(52) U.S. Cl.
CPC ..... *G06K 9/00885* (2013.01); *G06K 9/00013* (2013.01); *G06K 9/2063* (2013.01);
(Continued)

(58) Field of Classification Search
CPC ............ G06F 3/017; G06K 9/00355; G06K 2009/00932; G06T 19/006; G06T 2207/30196
(Continued)

(56) References Cited

U.S. PATENT DOCUMENTS 8,803,963 B2 * 8/2014 Pulluru .................. G06F 21/32
348/77
2011/0169934 A1 7/2011 Pulluru et al.

FOREIGN PATENT DOCUMENTS

CN 101425134 A 5/2009
CN 101789075 A 7/2010
(Continued)

OTHER PUBLICATIONS

International Search Report and Written Opinion dated Aug. 24, 2016 in International Application PCT/CN2015/095436.

*Primary Examiner* — Charlotte M Baker
(74) *Attorney, Agent, or Firm* — Pillsbury Winthrop Shaw Pittman LLP

(57) ABSTRACT

The present teachings provides a palm vein identification device and a palm vein identification method. The method may comprise: acquiring a target palm vein image of a user; extracting a region of interest (ROI) from the target palm vein image of the user; acquiring feature data corresponding to the ROI, wherein the feature data are obtained by binarization processing; and comparing the feature data corresponding to the target palm vein image against feature data corresponding to a registered original palm vein image to perform identification on the target palm vein image of the user, wherein the feature data corresponding to the registered original palm vein image are obtained by calculation in advance.

12 Claims, 13 Drawing Sheets

(51) Int. Cl.

| | | |
|---|---|---|
| *G06K 9/32* | (2006.01) | |
| *G06K 9/62* | (2006.01) | |
| *G06T 7/73* | (2017.01) | |
| *G06K 9/20* | (2006.01) | |
| *G06K 9/38* | (2006.01) | |
| *G06K 9/42* | (2006.01) | |

(52) U.S. Cl.
CPC ......... *G06K 9/3233* (2013.01); *G06K 9/3241* (2013.01); *G06K 9/4628* (2013.01); *G06K 9/4642* (2013.01); *G06K 9/6202* (2013.01); *G06K 9/6203* (2013.01); *G06K 9/6215* (2013.01); *G06T 7/73* (2017.01); *G06K 9/38* (2013.01); *G06K 9/42* (2013.01); *G06K 2009/00932* (2013.01); *G06T 2207/20021* (2013.01); *G06T 2207/30101* (2013.01)

(58) Field of Classification Search
USPC .............................................. 382/115; 348/77
See application file for complete search history.

(56) References Cited

FOREIGN PATENT DOCUMENTS

| CN | 102622587 A | 8/2012 |
|---|---|---|
| CN | 204258901 U | 4/2015 |

* cited by examiner

PALM VEIN IDENTIFICATION METHOD AND DEVICE

CROSS-REFERENCE TO RELATED APPLICATION

The present application claim priority to International Patent Application No. PCT/CN2015/095436, filed on Nov. 24, 2015, the disclosure of which is incorporated herein by reference in its entirety.

BACKGROUND

1. Technical Field

The present teachings relates to biometric identification technology, and more particularly to a method and a device for palm vein identification.

2. Technical Background

Palm vein identification is a biometric technique for personal identification based on palm vein distribution. Palm veins located under the epidermis are individual-specific. As human hands are usually in a half-clenched state, palm vein information is not easily stolen, which provides a high level of security. Besides, palm veins contain a wealth of feature information suitable for personal identification in fields such as public security, business, and financial affairs that have high security requirements. Thus, palm vein identification has garnered more and more attention from researchers at home and abroad in recent years.

Existing techniques for palm vein feature extraction and identification used in recent years can generally be divided into two categories: techniques based on overall subspace learning, and techniques based on curve matching. In the former, the whole palm vein is taken for global description and a palm vein image is projected to a subspace for extracting characteristic vectors. For example, palm vein matching is performed by using a feature recognition process: palm print and palm vein images are fused to form a Laplacian palm feature image for global matching, and local features of the palm vein image are finally extracted. In the latter, palm vein images are subjected to curve feature or linear feature extraction, such as palm vein feature extraction based on the median included angle chain code. This technique has a better identification effect for high-quality palm vein images with fewer broken vein lines. Additionally, this technique uses different filters to encode a palm vein image, extracting textural features of the palm vein image and analyzing frequency-domain textural information to achieve a good recognition effect.

The subspace learning algorithms based on global feature extraction have a high recognition rate but also result in a higher feature dimensionality and a long computing time. The algorithms based on curve matching require a set of experimental parameters related to a specific environment, and the recognition effect would be unsatisfactory when there is a change to palm gesture, palm size, or lighting conditions.

SUMMARY

The embodiments of the present teachings provide a method and a device for palm vein identification, which is capable of effectively reducing computing time. The feature data obtained after filtering has higher ability of being identified, thus improving the identification effect of the present solution. Also, performing a binarization processing on the feature data after the filtering can significantly reduce data volume, thereby enhancing the practicability of the solution.

Thus, in a first aspect, the present teachings provides a palm vein identification method, comprising: acquiring a target palm vein image of a user; extracting a region of interest (ROI) from the target palm vein image of the user; acquiring feature data corresponding to the ROI, wherein the feature data are obtained by filtering followed by binarization processing; and comparing the feature data corresponding to the target palm vein image against feature data corresponding to a registered original palm vein image to perform identification on the target palm vein image of the user, wherein the feature data corresponding to the registered original palm vein image are obtained by calculation in advance.

In a first possible embodiment of the first aspect of the present teachings, extracting the region of interest (ROI) from the target palm vein image of the user comprises: acquiring 9 key points in the target palm vein image, wherein the 9 key points include a left end point connected with a largest crosswise palm line, a right end point connected with the largest crosswise palm line, a valley point between a thumb and an index finger, a valley point between the index finger and a middle finger, a valley point between the middle finger and the ring finger, a valley point between the ring finger and the little finger, a valley point between the little finger and the palm, a boundary point connected with the valley point between the index finger and the middle finger, and a boundary point connected with the valley point between the ring finger and the little finger; and determining the ROI by locating the 9 key points.

In a second possible embodiment of the first aspect of the present teachings, extracting the region of interest (ROI) from the target palm vein image of the user comprises: acquiring 7 key points in the target palm vein image or acquiring 5 key points in the target palm vein image; and determining the ROI by locating the 7 key points or the 5 key points.

In a third possible embodiment of the first aspect of the present teaching, after extracting the region of interest (ROI) from the target palm vein image of the user, the process further comprises: performing normalization processing on the ROI; and adjusting a grayscale of the ROI and performing normalization processing on the ROI after grayscale adjustment.

In a fourth possible embodiment based on the third possible embodiment of the first aspect of the present teachings, acquiring feature data corresponding to the ROI comprises: dividing the ROI into a plurality of image blocks; convolving each image block with a convolution window and obtaining a plurality of feature values, wherein the convolution window and the image block are equally sized; and acquiring the feature data after performing binarization processing on the plurality of feature values.

In a fifth possible embodiment of the first aspect of the present teachings, comparing the feature data corresponding to the target palm vein image against feature data corresponding to a registered original palm vein image to perform identification on the target palm vein image of the user comprises: calculating a similarity between the feature data corresponding to the target palm vein image and the feature data corresponding to the registered palm vein image by using the following formula:

$$S(x_1, x_2) = \frac{F}{H(x_1, x_2)} + B$$

Wherein: $x_1$ represents the feature data corresponding to the target palm vein image, $x_2$ represents the feature data corresponding to the registered palm vein image, $S(x_1, x_2)$ represents the similarity between the feature data corresponding to the target palm vein image and the feature data corresponding to the registered palm vein image, $H(x_1, x_2)$ represents a Hamming distance between $x_1$ and $x_2$, and F and B are constants.

In a second aspect, the present teachings provides a palm vein identification device, comprising: a first acquisition module configured to acquire a target palm vein image of a user; an extraction module configured to extract a region of interest (ROI) from the user's target palm vein image acquired by the first acquisition module; a second acquisition module configured to acquire feature data corresponding to the ROI extracted by the extraction module, wherein the feature data are obtained by filtering followed by binarization processing; and an identification module configured to compare the feature data acquired by the second acquisition module corresponding to the target palm vein image against feature data corresponding to a registered original palm vein image to perform identification on the target palm vein image of the user, wherein the feature data corresponding to the registered original palm vein image are obtained by calculation in advance.

In a first possible embodiment of the second aspect of the present teachings, the extraction module comprises: a first acquisition unit configured to acquire 9 key points in the target palm vein image, wherein the 9 key points include a left end point connected with a largest crosswise palm line, a right end point connected with the largest crosswise palm line, a valley point between a thumb and an index finger, a valley point between the index finger and a middle finger, a valley point between the middle finger and a ring finger, a valley point between the ring finger and a little finger, a valley point between the little finger and the palm, a boundary point connected with the valley point between the index finger and the middle finger, and a boundary point connected with the valley point between the ring finger and the little finger; and a first locating unit configured to determine the ROI by locating the 9 key points acquired by the first acquisition unit.

In a second possible embodiment of the second aspect of the present teachings, the extraction module comprises: a second acquisition unit configured to acquire 7 key points in the target palm vein image or acquire 5 key points in the target palm vein image; and a second locating unit configured to determine the ROI by locating the 7 key points or the 5 key points acquired by the second acquisition unit.

In a third possible embodiment of the second aspect of the present teachings, the palm vein identification device further comprises: a normalization module configured to perform normalization processing on the ROI after the ROI is extracted by the extraction module from the target palm vein image of the user; and a grayscale adjustment module configured to adjust a grayscale of the ROI after the normalization by the normalization module and further perform normalization processing on the ROI after grayscale adjustment.

In a fourth possible embodiment based on the third possible embodiment of the second aspect of the present teachings, the second acquisition module comprises: a dividing unit configured to divide the ROI into a plurality of image blocks; a convolution unit configured to convolve each of the divided image blocks with a convolution window and obtain a plurality of feature values, wherein the convolution window and the image block are equally sized; and a binarization unit configured to acquire the feature data after performing binarization processing on the plurality of feature values obtained by the convolution unit.

In a fifth possible embodiment of the second aspect of the present teachings, the identification module comprises: a calculation unit configured to calculate a similarity between the feature data corresponding to the target palm vein image and the feature data corresponding to the registered palm vein image by using the following formula:

$$S(x_1, x_2) = \frac{F}{H(x_1, x_2)} + B$$

Wherein: $x_1$ represents the feature data corresponding to the target palm vein image, $x_2$ represents the feature data corresponding to the registered palm vein image, $S(x_1, x_2)$ represents the similarity between the feature data corresponding to the target palm vein image and the feature data corresponding to the registered palm vein image, $H(x_1, x_2)$ represents a Hamming distance between $x_1$ and $x_2$, and F and B are constants.

In a third aspect, the present teachings provides a palm vein identification device, comprising: a processor and a memory; the memory being configured to store a program; and the processor being configured to execute the program stored in the memory so that the palm vein identification device executes a palm vein identification process, as described in the first through fifth possible embodiments of the first and second aspects of the present teachings.

In a fourth aspect, the present teachings provides a storage medium for storing one or more programs, comprising: one or more programs which comprise an instruction so that when the instruction is executed by a palm vein identification device comprising one or more processors, the palm vein identification device executes the palm vein identification process as described in the first through fifth possible embodiments of the first and second aspects of the present teachings.

Based on the above technical solutions, the present teachings has the following advantages: in some embodiments, the present teachings features the following steps: acquiring a target palm vein image of a user; extracting a region of interest (ROI) from the target palm vein image; acquiring feature data corresponding to the ROI, wherein the feature data are obtained by binarization processing; and comparing the feature data corresponding to the target palm vein image against feature data corresponding to a registered original palm vein image to perform identification on the target palm vein image of the user. The above approach can effectively reduce the computing time, and the feature data obtained after filtering has higher ability of being identified, thus improving the identification effect of the present solution. Also, performing binarization processing on the feature data after filtering can significantly reduce data volume, thereby enhancing the practicability of the solution.

BRIEF DESCRIPTION OF THE DRAWINGS

The accompanying drawings are intended to illustrate embodiments of the present teachings. It is readily apparent that these drawings only describe some embodiments of the present teachings. A person of ordinary skill in the art can derive other drawings from these accompanying drawings given herein without creative efforts.

DETAILED DESCRIPTION

The present teachings will be better understood by reference to the following detailed description in connection with the accompanying drawings. It should be clear that the embodiments to be described are only some of the embodiments of the invention rather than all embodiments of the invention. Other embodiments derived by those of ordinary skill in the art based on the embodiments given herein without any creative effort shall all fall into the protection scope of the present teachings.

The terms "first," "second," "third," "fourth," and the like (if any) in the description, claims, and drawings are used for distinguishing between similar elements and not necessarily for describing a sequential or chronological order. The terms are interchangeable under appropriate circumstances, and the embodiments of the present teachings can operate in sequences other than described or illustrated herein. Also, the terms "comprise," "include," "have," and any variations thereof are used synonymously to denote non-exclusive inclusion. For example, a process, method, technique, system product, or apparatus comprising a series of steps or units is not necessarily limited to the steps or units expressly listed and can include other steps or units not expressly listed or inherent to such process, method, technique, system product, or apparatus.

The embodiments of the present teachings provide a palm vein identification process. For the convenience of description, the process is described from the perspective of a palm vein identification device.

The embodiments of the present teachings provide a palm vein identification process, used for comparing feature data of an ROI in a target palm vein image against feature data of the ROI in a registered original palm vein image to perform identification on the target palm vein image of the user, thereby effectively reducing computing time. Also, performing the binarization processing on the feature data after filtering can significantly reduce data volume and enhance the practicability of the solution.

Figure 1:
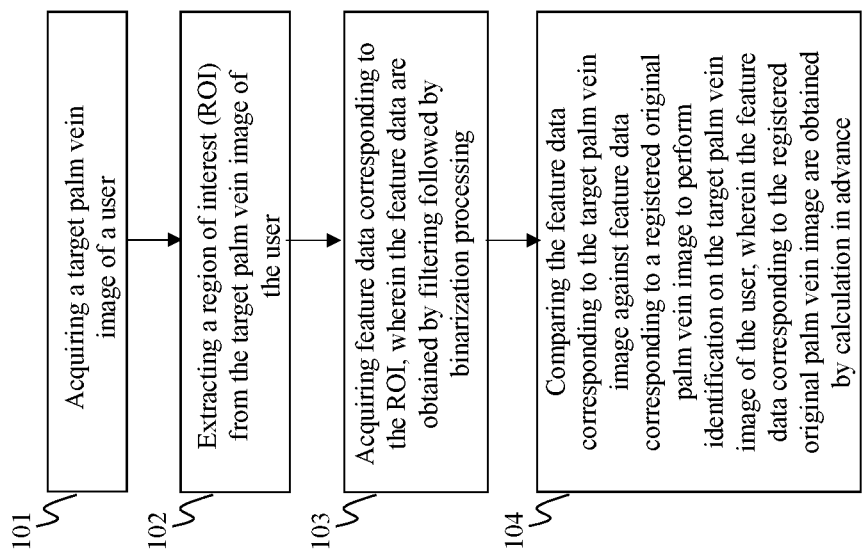
FIG. 1 illustrates a palm vein identification process in accordance with an embodiment of the present teachings.

FIG. 1 illustrates a palm vein identification process in accordance with an embodiment of the present teachings. Referring to FIG. 1, the palm vein identification process may comprise, at step 101, acquiring a target palm vein image of a user. In this embodiment, a palm vein identification device acquires a target palm vein image of a user. The palm vein identification device turns on near-infrared light irradiation. Since the palmar venous blood can absorb near infrared light, venous blood vessels reflect less light, and they are darker than surrounding areas, thus forming a palm vein pattern. An image containing such a palm vein pattern is defined as a target palm vein image. Near-infrared light lies between the visible and MIR regions of the electromagnetic spectrum and is defined by the American Society for Testing and Materials (ASTM) as a spectral region spanning the wavelength range 780-2,526 nm.

Figure 2:
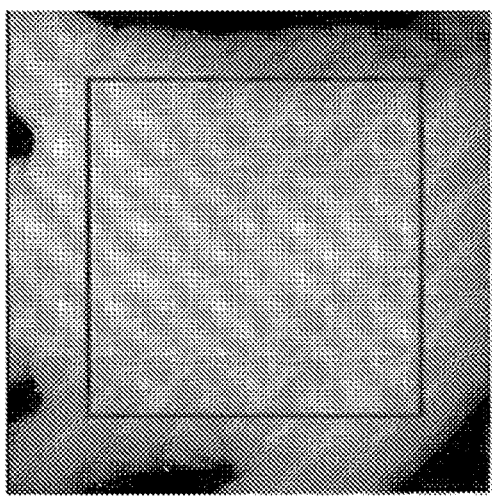
FIG. 2 is a target palm vein image in accordance with an embodiment of the present teachings.

At step 102, a region of interest (ROI) may be extracted from the target palm vein image of the user. In this embodiment, the palm vein identification device extracts an ROI from the target palm vein image. FIG. 2 is a target palm vein image in accordance with an embodiment of the present teachings. Referring to FIG. 2, a target palm vein image is shown. The pixel size of the target palm vein image can be set as 184×184. A pixel is a unit of resolution. The square region in the image is a region of interest (ROI). The ROI can be set as 129×129.

At step 103, feature data corresponding to the ROI may be acquired, wherein the feature data are obtained by filtering, followed by binarization processing. In this embodiment, to acquire feature data corresponding to the ROI, a plurality of Gabor filters are used for filtering the ROI, thereby obtaining palm vein image features of high ability of being identified. A Gabor filter can effectively extract image frequency and direction characteristics sensitive to the human visual system. Thus, using Gabor filters for the filtering can achieve good results.

In this embodiment, even-symmetric two-dimensional Gabor filters are used and calculated as follows:

$$h(x, y) = \frac{1}{2\pi\delta_u\delta_v}\exp\left\{-\frac{1}{2}\left(\frac{u^2}{\delta_u^2} - \frac{v^2}{\delta_v^2}\right)\right\}\cos(\omega u)$$

Here, $u = x \cos \theta + y \sin \theta$, and $v = y \cos \theta - x \sin \theta$. Furthermore, $\theta$ is a direction of the filter, $\delta_u$ is a standard deviation of the Gaussian envelope parallel to the $\theta$ direction, $\delta_v$ is a standard deviation of the Gaussian envelope vertical to the $\theta$ direction and can be set as "1" herein, and $\omega$ is a frequency of the complex sinusoidal function.

Figure 3:
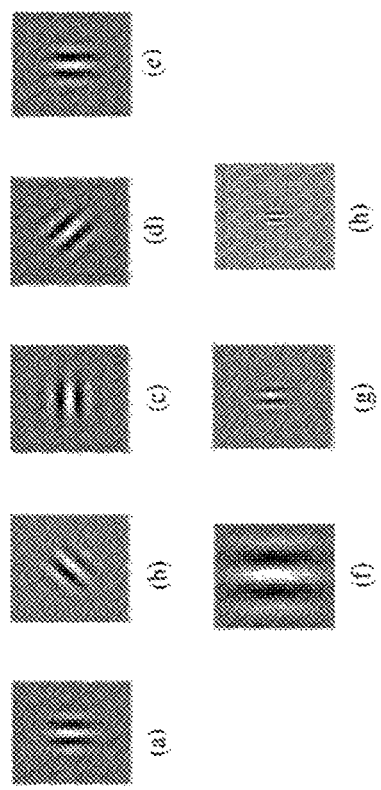
FIG. 3 illustrates different effects of a Gabor filter kernel function under different parameter configurations in accordance with embodiments of the present teachings.

FIG. 3 illustrates different effects of a Gabor filter kernel function under different parameter configurations in accordance with embodiments of the present teachings. As shown in FIG. 3, (a) is an image of the Gabor filter kernel function when $\theta=0$; (b) is an image of the Gabor filter kernel function when $\theta=\pi/4$; (c) is an image of the Gabor filter kernel function when $\theta=\pi/2$; (d) is an image of the Gabor filter kernel function when $\theta=3\pi/4$; (e) is an image of the Gabor filter kernel function when $\theta=\pi$; (f) is an image of the Gabor filter kernel function when $\theta=0.1$; (g) is an image of the Gabor filter kernel function when θ=0.3; (h) is an image of the Gabor filter kernel function when θ=0.

Research has found that Gabor filters are highly suitable for texture expression and separation. In a spatial domain, a two-dimensional Gabor filter is a Gaussian kernel function modulated by sinusoidal plane waves. Feature data corresponding to the ROI can be obtained after the ROI is filtered. For example, filtering of the ROI to obtain feature data can be achieved by convolution operations. After filtering, the feature data are subjected to binarization processing. An original 16 4-byte feature data are compressed into 2-byte data, which is equivalent to introducing 2-byte feature data, thereby greatly reducing the data volume.

At step 104, the feature data corresponding to the target palm vein image may be compared against feature data corresponding to a registered original palm vein image to perform identification on the target palm vein image of the user, wherein the feature data corresponding to the registered original palm vein image are obtained by calculation in advance. In this embodiment, a database corresponding to the palm vein identification device stores a large amount of palm vein image feature data from different users. These feature data can be referred to as feature modules. The term feature data is used in this embodiment. In addition, these palm vein images of different users are known as registered original palm vein images. For each registered original palm vein image, its ROI needs to be extracted and the corresponding feature data should be calculated and stored in the database. In this way, feature data with smaller data volume are obtained so that the database can store as much feature data of registered palm vein images as possible.

After receiving a user's target palm vein image, the palm vein identification device acquires feature data of the target palm vein image by the process described in steps 101-103. Subsequently, the feature data of the target palm vein image are compared against feature data of registered original palm vein images from different users stored in a back-end database. A series of algorithms are used to determine their similarity. If the similarity is within a preset error range, the user's target palm vein image is successfully identified. If the similarity exceeds the preset error range, identification of the user's target palm vein image fails.

This embodiment of the present teachings features the following steps: acquiring a target palm vein image of a user; extracting an ROI from the target palm vein image; acquiring feature data corresponding to the ROI, wherein the feature data are obtained by filtering followed by binarization processing; and comparing the feature data corresponding to the target palm vein image against feature data corresponding to a registered original palm vein image to perform identification on the target palm vein image of the user. The above approach can effectively reduce the computing time. The feature data obtained after filtering has higher ability to be identified, thus improving the identification effect of the present solution. Also, performing the binarization processing on the feature data after the filtering can significantly reduce data volume, thereby enhancing the practicability of the solution.

In a first optional embodiment of the palm vein identification process based on the embodiment illustrated in FIG. 2, extracting a region of interest (ROI) from the target palm vein image of the user can comprise: acquiring 9 key points in the target palm vein image, including a left end point connected with a largest crosswise palm line, a right end point connected with the largest crosswise palm line, a valley point between a thumb and an index finger, a valley point between the index finger and a middle finger, a valley point between the middle finger and a ring finger, a valley point between the ring finger and a little finger, a valley point between the little finger and the palm, a boundary point connected with the valley point between the index finger and the middle finger, and a boundary point connected with the valley point between the ring finger and the little finger; and determining the ROI by locating the 9 key points.

Figure 4:
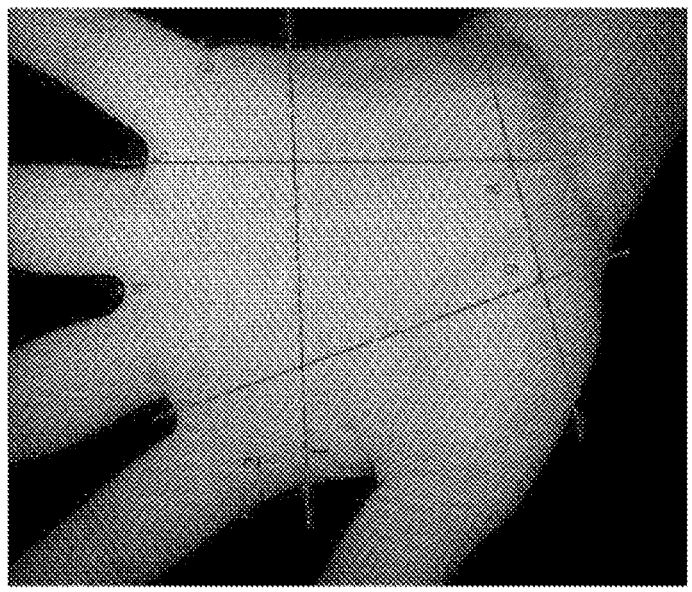
FIG. 4 is a palm vein image containing key points in accordance with an embodiment of the present teachings.

In this embodiment, a training library is formed by manually labeling a large number of key points. After a series of cascade regression trainings, an algorithm for detecting key points can be learned so that the nine key points can be detected on a palm vein image. FIG. 4 is a palm vein image containing key points in accordance with an embodiment of the present teachings. Points 1-9 are the 9 key points. The 9 key points are detected from each frame of the palm vein image captured by the palm vein identification device.

As shown in FIG. 4, when a target palm vein image is acquired, 9 key points can be obtained, including a left end point connected with a largest crosswise palm line (key point 1 of FIG. 4), a right end point connected with the largest crosswise palm line (key point 7 of FIG. 4), a valley point between the thumb and the index finger (key point 2 of FIG. 4), a valley point between the index finger and the middle finger (key point 3 of FIG. 4), a valley point between the middle finger and the ring finger (key point 4 of FIG. 4), a valley point between the ring finger and the little finger (key point 5 of FIG. 4), a valley point between the little finger and the palm (key point 6 of FIG. 4), a boundary point connected with the valley point between the index finger and the middle finger (key point 9 of FIG. 4), and a boundary point connected with the valley point between the ring finger and the little finger (key point 8 of FIG. 4).

Lines in the drawing are used for assisting in locating four key points 1, 7, 8, and 9. Line 3-9 (a connecting line between key point 3 and key point 9) is parallel to a left margin of the palm. Line 5-8 (a connecting line between key point 5 and key point 8) is parallel to a right margin of the palm. Line 1-7 (a connecting line between key point 1 and key point 7) coincides with the largest palm line in the middle of the palm. Line 8-9 (a connecting line between key point 8 and key point 9) is parallel to a bottom margin of the palm. Points 8 and 9 are located at a palm rest. There is a large slope from the palm rest toward the wrist direction, and the palm portion is longer in this direction. Thus, if the positioning is moved toward the wrist, different palm angles can result in an obvious difference, and the image size would easily be exceeded.

Assuming an affine transformation T, a target palm vein image is transformed into a standard palm vein image. First, it is assumed that this transformation transforms an arbitrary point $(x^0, y^0)$ on the target palm vein image into a certain point $(x,y)$ on the standard palm vein image, that is:

$$\begin{pmatrix} x \\ y \end{pmatrix} = T(x^0, y^0) = \begin{pmatrix} a_{11} & a_{12} \\ a_{21} & a_{22} \end{pmatrix} \begin{pmatrix} x^0 \\ y^0 \end{pmatrix} + \begin{pmatrix} b^1 \\ b^2 \end{pmatrix}.$$

It is necessary to solve 6 parameters of the transformation: $a_{11}$, $a_{12}$, $a_{21}$, $a_{22}$, $b_1$, and $b_2$ so as to minimize the overall error after transformation of the 9 key points. That is:

$$\arg_{a_{11},a_{12},a_{21},a_{22},b_1,b_2} \Sigma_{g_i=1}^{9} \|T(x_i^0, y_i^0) - (x_i, y_i)\|^2$$

Wherein: $\{(x_i^0, y_i^0) | y = 1 \ldots 9\}$ represents 9 key points on the target palm vein image, while $\{(x_i, y_i) | y = 1 \ldots 9\}$ represents 9 key points on the standard palm vein image. The aforementioned can be solved by the least square method. In this way, for each point on the standard palm vein image, a corresponding point on the target palm vein image can be found by affine transformation, and its grayscale value can be taken as the grayscale value of the standard palm vein image. Accordingly, any palm vein image can be transformed into a standard palm vein image. For a target palm vein image, however, it is only necessary to extract an image corresponding to the ROI, and the ROI can be determined by locating 9 key points. In the technique of the present teachings based on affine transformation of 9 key points, when ROI extraction is performed, geometric normalization is completed automatically.

Further, in embodiments of the present teachings, key points of a large number of palm images are labeled to obtain training samples, which are subjected to machine learning to obtain an algorithm for detecting key points. When identifying a target palm vein image, the position of the palm on the image is accurately determined by locating the key points, thereby determining a ROI whose center is the center of the palm. When the ROI is located by the 9 key points, it is unnecessary to locate any border, and the 9 key points are located directly by cascade regression. Then, the 9 key points are used to solve affine transformation of the ROI. Such an algorithm is simple and efficient. Further, the ROI obtained by using the 9 key points has higher ability of being identified, thus improving the identification effect of the present solution.

In a second optional embodiment of the palm vein identification method based on the embodiment illustrated in FIG. 2, extracting the region of interest (ROI) from the target palm vein image of the user can comprise: acquiring 7 key points in the target palm vein image or acquiring 5 key points in the target palm vein image; and determining the ROI by locating the 7 key points or the 5 key points. In this embodiment, similar to the first optional embodiment in FIG. 2, key points of a large number of palm images are manually labeled to obtain a training library, which is subjected to a series of cascade regression trainings to obtain an algorithm for detecting key points. In this way, 7 key points can be detected on a palm vein image.

Referring to FIG. 4, a palm vein image containing key points is shown in accordance with an embodiment of the present teachings. The 7 key points can be a left end point connected with a largest crosswise palm line (key point 1 of FIG. 4), a valley point between the thumb and the index finger (key point 2 of FIG. 4), a valley point between the index finger and the middle finger (key point 3 of FIG. 4), a valley point between the middle finger and the ring finger (key point 4 of FIG. 4), a valley point between the ring finger and the little finger (key point 5 of FIG. 4), a valley point between the little finger and the palm (key point 6 of FIG. 4), and a right end point connected with the largest crosswise palm line (key point 7 of FIG. 4).

In another embodiment, the 7 key points can also be a valley point between the thumb and the index finger (key point 2 of FIG. 4), a valley point between the index finger and the middle finger (key point 3 of FIG. 4), a valley point between the middle finger and the ring finger (key point 4 of FIG. 4), a valley point between the ring finger and the little finger (key point 5 of FIG. 4), a valley point between the little finger and the palm (key point 6 of FIG. 4), a boundary point connected with the valley point between the ring finger and the little finger (key point 8 of FIG. 4), and a boundary point connected with the valley point between the index finger and the middle finger (key point 9 of FIG. 4).

Further, the ROI can be determined by 5 key points, which can include: a valley point between the thumb and the index finger (key point 2 of FIG. 4), a valley point between the index finger and the middle finger (key point 3 of FIG. 4), a valley point between the middle finger and the ring finger (key point 4 of FIG. 4), a valley point between the ring finger and the little finger (key point 5 of FIG. 4), and a valley point between the little finger and the palm (key point 6 of FIG. 4).

In any of the above three methods using key points, for each point on the standard palm vein image, a corresponding point on the target palm vein image can be found by affine transformation, and its grayscale value can be taken as the grayscale value of the standard palm vein image. Accordingly, any palm vein image can be transformed into a standard palm vein image. For a target palm vein image, however, it is only necessary to extract an image corresponding to the ROI, and the ROI can be determined by locating 4 key points. An image edge detection based method or a maximum inscribed circle based method can be used for ROI extraction. In the method of the present teachings based on affine transformation of 9 key points, when ROI extraction is performed, geometric normalization is completed automatically.

It can be understood that the affine transformation in this embodiment can be performed in a manner similar to that in the first optional embodiment of FIG. 2, and thus is not described again herein. Further, in embodiments of the invention, the ROI is determined by locating 5 or 7 of the 9 key points, and a new key point model is constructed. This can enhance feasibility of the present solution and only requires locating 5 or 7 key points to determine the ROI. In this way, the solution becomes more practical and flexible, thereby improving the efficiency of key point acquisition.

In a third optional embodiment of the palm vein identification process based on the embodiment illustrated in FIG. 2, after extracting the region of interest (ROI) from the target palm vein image of the user, the process can further comprise: performing normalization processing on the ROI; and adjusting a grayscale of the ROI and performing normalization processing on the ROI after grayscale adjustment. In this embodiment, the extracted ROI is normalized to eliminate the effects of image illumination inconsistency and unevenness. When the palm is close to the camera lens, the reflected near-infrared light is strong, and the image captured appears to be bright. When the palm is far away from the lens, the reflected near-infrared light is weak, and the image captured appears to be dark. Moreover, factors like ambient light changes, palm angle changes, and imaging circuit automatic gain control can affect overall brightness, local brightness, and brightness uniformity of images, while grayscale normalization eliminates these effects.

Normalization processing of the ROI is a part of image preprocessing. The normalization can be performed by the method described in the first optional embodiment corresponding to FIG. 2 and thus is not detailed again herein. The grayscale of the ROI also needs to be normalized. Specifically, images are preprocessed so that they have the same mean value and standard deviation in a square region having a width of r. Assuming that $r=30$, $\overline{m}=128$, and standard deviation $\overline{v}=128$, for any pixel in the ROI, the mean value m and variance v of all pixels in the square region having a width of r and centered at the pixel are calculated. Subsequently, the grayscale value of the pixel is subjected to transformation using the following formula:

$$\text{gray} = (\text{gray} - m) \times \frac{v}{\bar{v}} + \bar{m}$$

Figure 5:
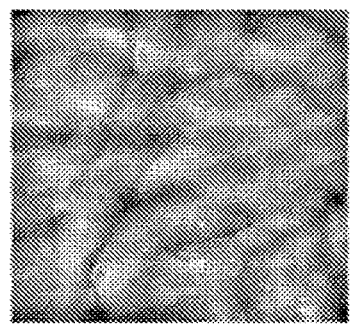
FIG. 5 illustrates an ROI of a palm vein image before grayscale normalization and after normalization in accordance with embodiments of the present teachings.
Figure 5:
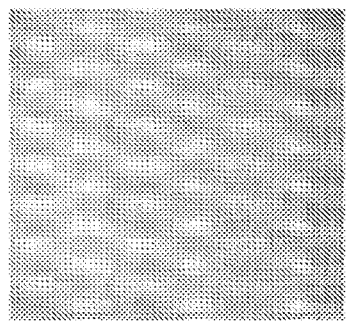

Wherein: "gray" is the grayscale value of the pixel, m is a value of all pixels in the square region, $\bar{m}$ is the mean value of all pixels in the square region, v is a variance of all pixels in the square region, and $\bar{v}$ is the standard deviation of all pixel values in the square region. FIG. 5 illustrates an ROI of a palm vein image before grayscale normalization and after normalization in accordance with embodiments of the present teachings. In FIG. 5, (a) is an ROI image before grayscale normalization, and (b) is an ROI image after grayscale normalization. It is apparent that after grayscale normalization, the overall brightness, local brightness, and brightness uniformity of the ROI image are improved.

Further, in embodiments of the present teachings, normalization of the ROI helps quantify data simply and accurately, and slight changes in operation conditions have insignificant influence on the analysis result, thereby increasing the stability of the solution proposed herein, simplifying calculation, and improving operation efficiency. The grayscale adjustment after normalization of the ROI can reduce the data volume of original data and reduce calculation in subsequent processing. Factors like ambient light changes, palm angle changes, and imaging circuit automatic gain control can affect overall brightness, local brightness, and brightness uniformity of images. Grayscale normalization eliminates these effects and improves user experience.

In a fourth optional embodiment of the palm vein identification process based on the third optional embodiment corresponding to FIG. 2, acquiring feature data corresponding to the ROI can comprise: dividing the ROI into a plurality of image blocks; convolving each image block with a convolution window and obtaining a plurality of feature values, wherein the convolution window and the image block are equally sized; and acquiring the feature data after performing binarization processing on the plurality of feature values. In this embodiment, the ROI is first divided into image blocks. According to the description of Gabor filters in the above embodiments, two sets of data obtained by the Gabor filters at two frequencies of 16 directions per frequency can be calculated. The data may be assumed to be filtered by Gabor filters at two frequencies of 16 directions per frequency and a convolution window 19×19 in size is taken. According to different frequencies, these data are divided into two groups:

$$\left\{ G_{\theta_i}^{(\omega_1)} \mid \theta_i = \frac{i\pi}{16}, i = 0 \ldots 15 \right\}$$

$$\left\{ G_{\theta_i}^{(\omega_2)} \mid \theta_i = \frac{i\pi}{16}, i = 0 \ldots 15 \right\}$$

After normalization, the palm vein image having a size of 129×129 is filtered. Starting from the upper left corner, image blocks with the same size as the convolution window are convolved. The size of the convolution window is 19×19. In this way, 2 groups of 16 feature values are obtained: $\{v_{\theta_i}^{\omega_1}\}$, $\{v_{\theta_i}^{\omega_2}\}$. Feature data are acquired after binarization processing of the feature values. The 16 feature values in each group are encoded into feature data as follows:

$$v^{\omega_1} = 1(v_0^{\omega_1} > v_{15}^{\omega_1}) \times 2^{15} + \sum_{i=0}^{14} 1(v_{i+1}^{\omega_1} > v_i^{\omega_1}) \times 2^i$$

$$v^{\omega_2} = 1(v_0^{\omega_2} > v_{15}^{\omega_2}) \times 2^{15} + \sum_{i=0}^{14} 1(v_{i+1}^{\omega_2} > v_i^{\omega_2}) \times 2^i$$

Wherein: 1() means the value is 1 if the expression in the parentheses is "true," or otherwise it is "0." The integers $v^{\omega_1}$ and $v^{\omega_2}$ in the above formula are actually less than $2^{16}$. Thus, they can be expressed as 2-byte feature data, and one image block can be expressed as 4-byte feature data.

Figure 6:
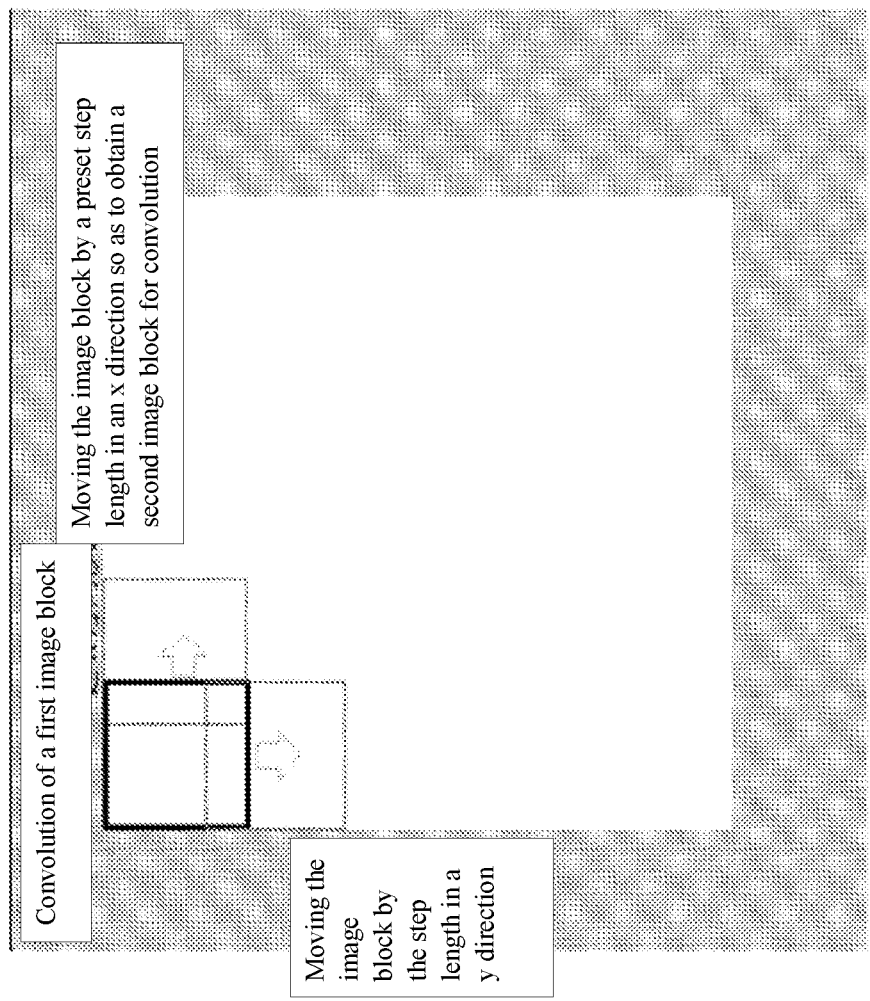
FIG. 6 illustrates image convolution in accordance with an embodiment of the present teachings.

Thus, a convolution window having the same pixel size as image blocks can be used for convolution. FIG. 6 illustrates image convolution in accordance with an embodiment of the present teachings. Referring to FIG. 6, first, an image block is moved by a preset step length in an x direction to a next position. Assuming that the step length is 15, the new image block is taken for convolution, thereby obtaining a 4-byte data. In this way, the image block is moved to a next position until its crosses the boundary of normalized ROI in the x direction. Subsequently, the x position is reset to 0, and the image block is moved by a preset step length (also 15) in a y direction to a next position, thereby obtaining feature data. Such movement is continued back and forth until the entire ROI is covered.

Assume that the pixel size of the ROI is 129×129, the size of the convolution window is 19×19, and the step length is 15×15. Then, the number of bytes of the last feature data is:

$$4 \times \left( \frac{129-19}{15} + 1 \right) \times \left( \frac{129-19}{15} + 1 \right) = 256$$

In this way, a feature data template of ROI is established. Experiments show that, when $\omega_1=4.0$ and $\omega_2=4.5$, the Gabor filter complex sinusoidal function can achieve a good results and feature data so obtained have higher ability of being identified.

Further, in embodiments of the present teachings, a method for acquiring feature data is described, including: dividing an ROI into a plurality of image blocks; convolving each image block with a convolution window and obtaining a plurality of feature values, wherein the convolution window and the image block are equally sized; and finally acquiring the feature data after performing binarization processing on the plurality of feature values. If the speed and template space of the palm vein identification system are not greatly limited, more feature data (such as more frequencies and directions) are extracted so that the present solution has better identification effect. Further, in the present teachings, parameters including the size of ROI, frequency of filters, direction, and step length can be adjusted as required so as to improve the practicability of the present solution. Binarization processing of feature data also has the following benefits: First, it greatly reduces data volume. If 16 original 4-byte feature data are compressed to 2-byte data, it means the data volume is reduced to one-third of the original data volume. Second, binarization processing can increase the ability to identify the data. The 2-byte feature data obtained after binarization processing are equivalent to a pattern feature, with a high capacity for expressing texture feature of palm vein.

In a fifth optional embodiment of the palm vein identification method based on the embodiment illustrated in FIG. 2, comparing the feature data corresponding to the target palm vein image against feature data corresponding to a registered original palm vein image to perform identification on the target palm vein image of the user can comprise: calculating a similarity between the feature data corresponding to the target palm vein image and the feature data corresponding to the recorded palm vein image by using the following formula:

$$S(x_1, x_2) = \frac{F}{H(x_1, x_2)} + B$$

Here, $x_1$ represents the feature data corresponding to the target palm vein image, $x_2$ represents the feature data corresponding to the recorded palm vein image, $S(x_1, x_2)$ represents the similarity between the feature data corresponding to the target palm vein image and the feature data corresponding to the recorded palm vein image, $H(x_1, x_2)$ represents a Hamming distance between $x_1$ and $x_2$, and F and B are constants.

In this embodiment, the present teachings provides a process for comparing feature data of a target palm vein image against feature data of original palm vein image stored in a database (e.g., by using the above formula to calculate their similarity). The database corresponding to the palm vein identification device stores palm vein image feature data from a large number of users, and these images are referred to as registered palm vein images. For each registered original palm vein image, it is necessary to extract its ROI, calculate its feature data, and store the feature data in the database. After 256-byte feature data are obtained by the process described in the above embodiment, the similarity between feature data and the Hamming distance are calculated.

The similarity between feature data corresponding to the target palm vein image and feature data corresponding to the recorded palm vein image is calculated by using the following formula:

$$S(x_1, x_2) = \frac{F}{H(x_1, x_2)} + B.$$

Here, $x_1$ represents feature data corresponding to the target palm vein image, $x_2$ represents feature data corresponding to the recorded palm vein image, $S(x_1, x_2)$ represents the similarity between the feature data corresponding to the target palm vein image and the feature data corresponding to the recorded palm vein image, $H(x_1, x_2)$ represents a Hamming distance between $x_1$ and $x_2$, and F and B are constants.

In information coding, a code distance also known as a Hamming distance between two legal codes is the number of digit positions at which the corresponding symbols are different. In a valid code set, the minimum value of Hamming distance between any two code words is called the Hamming distance of the code set. For example, starting from the first digit, 10101 and 00110 are different at the first, fourth, and fifth digits, which means the Hamming distance is 3. F and B are constants, which can be determined experimentally and calculated by, for example, simulation. Further, in embodiments, the present teachings provides a method for comparing target palm vein images against registered original palm vein images stored in a database so that the present solution is more practical. Using such similarity for identifying target palm vein images can increase identification effect of the present teachings.

Figure 7:
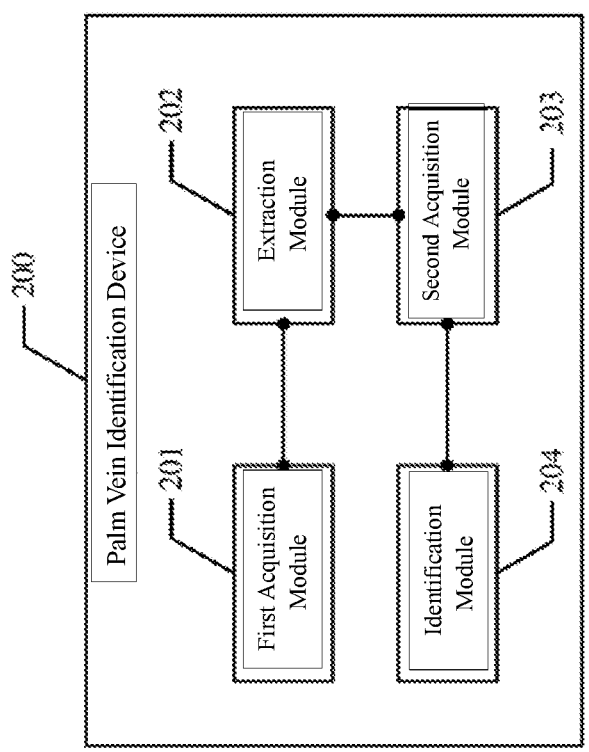
FIG. 7 illustrates a palm vein identification device in accordance with an embodiment of the present teachings.

The following describes a palm vein identification device in the present teachings. FIG. 7 illustrates a palm vein identification device in accordance with an embodiment of the present teachings. Referring to FIG. 7, a palm vein identification device 200 in embodiments of the presenting teachings comprises: a first acquisition module 201 configured to acquire a target palm vein image of a user; an extraction module 202 configured to extract a region of interest (ROI) from the user's target palm vein image acquired by the first acquisition module 201; a second acquisition module 203 configured to acquire feature data corresponding to the ROI extracted by the extraction module 202, wherein the feature data are obtained by filtering; and an identification module 204 configured to compare the feature data acquired by the second acquisition module 203 corresponding to the target palm vein image against feature data corresponding to a registered original palm vein image to perform identification on the target palm vein image of the user, wherein the feature data corresponding to the registered original palm vein image are obtained by calculation in advance.

In this embodiment, first acquisition module 201 acquires the user's target palm vein image. Extraction module 202 extracts a ROI from the acquired target palm vein image. Second acquisition module 203 acquires feature data corresponding to the ROI extracted by extraction module 202, wherein the feature data are obtained by filtering. Identification module 204 compares the feature data acquired by second acquisition module 203 corresponding to the target palm vein image against feature data corresponding to a registered original palm vein image so as to perform identification on the user's target palm vein image, wherein the feature data corresponding to the registered original palm vein image are obtained by calculation in advance.

Embodiments of the present teachings feature the following steps: acquiring a target palm vein image of a user; extracting an ROI from the target palm vein image; acquiring feature data corresponding to the ROI, wherein the feature data are obtained by filtering followed by binarization processing; and comparing the feature data corresponding to the target palm vein image against feature data corresponding to a registered original palm vein image to perform identification on the target palm vein image of the user. The above approach can effectively reduce computing time. The feature data obtained after filtering has higher ability of being identified, thus improving the identification effect of the present solution. Also, performing the binarization processing on the feature data after the filtering can significantly reduce data volume, thereby enhancing the practicability of the solution.

Figure 8:
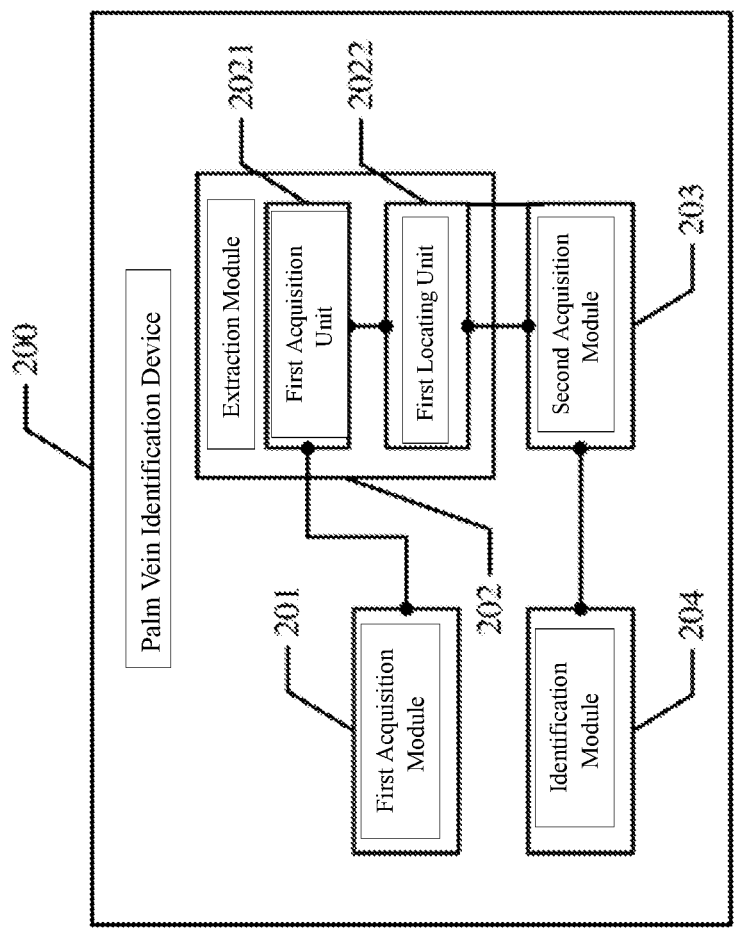
FIG. 8 illustrates a palm vein identification device in accordance with an embodiment of the present teachings.

FIG. 8 illustrates a palm vein identification device in accordance with an embodiment of the present teachings. Referring to FIG. 8, palm vein identification device 200 in this embodiment comprises: a first acquisition module 201 configured to acquire a target palm vein image of a user; an extraction module 202 configured to extract a region of interest (ROI) from the user's target palm vein image acquired by first acquisition module 201; a second acquisition module 203 configured to acquire feature data corresponding to the ROI extracted by the extraction module 202, wherein the feature data are obtained by filtering; and an identification module 204 configured to compare the feature data acquired by second acquisition module 203 corresponding to the target palm vein image against feature data corresponding to a registered original palm vein image to perform identification on the target palm vein image of the user, wherein the feature data corresponding to the registered original palm vein image are obtained by calculation in advance.

Extraction module 202 comprises: a first acquisition unit 2021 configured to acquire 9 key points in the target palm vein image, wherein the 9 key points include a left end point connected with a largest crosswise palm line, a right end point connected with the largest crosswise palm line, a valley point between a thumb and an index finger, a valley point between the index finger and a middle finger, a valley point between the middle finger and a ring finger, a valley point between the ring finger and a little finger, a valley point between the little finger and the palm, a boundary point connected with the valley point between the index finger and the middle finger, and a boundary point connected with the valley point between the ring finger and the little finger; and a first locating unit 2022 configured to determine the ROI by locating the 9 key points acquired by first acquisition unit 2021.

Further, in embodiments of the present teachings, key points of a large number of palm images are labeled to obtain training samples, which are subjected to machine learning to obtain an algorithm for detecting key points. When identifying a target palm vein image, the position of the palm on the image is accurately determined by locating the key points, thereby determining an ROI whose center is the center of the palm. When the ROI is located by the 9 key points, it is unnecessary to locate any border, and the 9 key points are located directly by cascade regression. Then, the 9 key points are used to solve affine transformation of the ROI. Such algorithm is simple and efficient. Further, the ROI so obtained by using the 9 key points has higher ability of being identified, thus improving the identification effect of the present solution.

Figure 9:
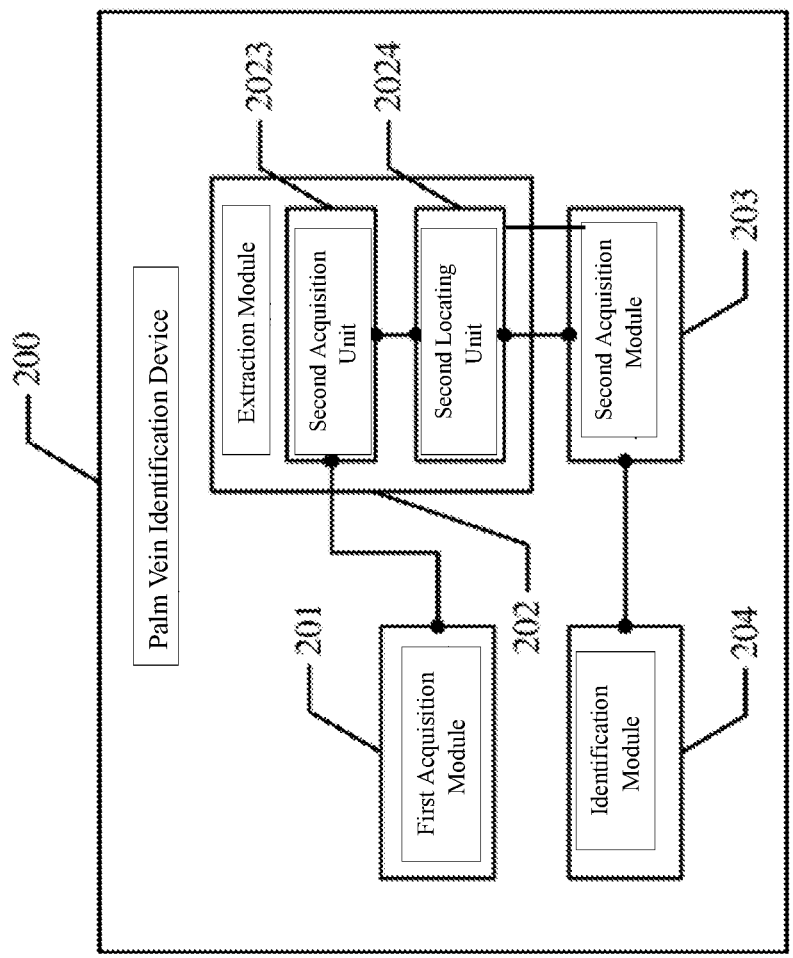
FIG. 9 illustrates a palm vein identification device in accordance with an embodiment of the present teachings.

FIG. 9 illustrates a palm vein identification device in accordance with an embodiment of the present teachings. Referring to FIG. 9, palm vein identification device 200, in this embodiment, may comprise: a first acquisition module 201 configured to acquire a target palm vein image of a user; an extraction module 202 configured to extract a region of interest (ROI) from the user's target palm vein image acquired by first acquisition module 201; a second acquisition module 203 configured to acquire feature data corresponding to the ROI extracted by extraction module 202, wherein the feature data are obtained by filtering; and an identification module 204 configured to compare the feature data acquired by second acquisition module 203 corresponding to the target palm vein image against feature data corresponding to a registered original palm vein image to perform identification on the target palm vein image of the user, wherein the feature data corresponding to the registered original palm vein image are obtained by calculation in advance.

Extraction module 202 comprises: a second acquisition unit 2023 configured to acquire 7 key points in the target palm vein image or acquire 5 key points in the target palm vein image; and a second locating unit 2024 configured to determine the ROI by locating the 7 key points or the 5 key points acquired by second acquisition unit 2023. Further, in embodiments of the present teaching, the ROI is determined by locating 5 or 7 of the 9 key points, and a new key point model is constructed. This can enhance feasibility of the present solution and only requires locating 5 or 7 key points to determine the ROI. In this way, the solution becomes more practical and flexible, thereby improving the efficiency of key point acquisition.

Figure 10:
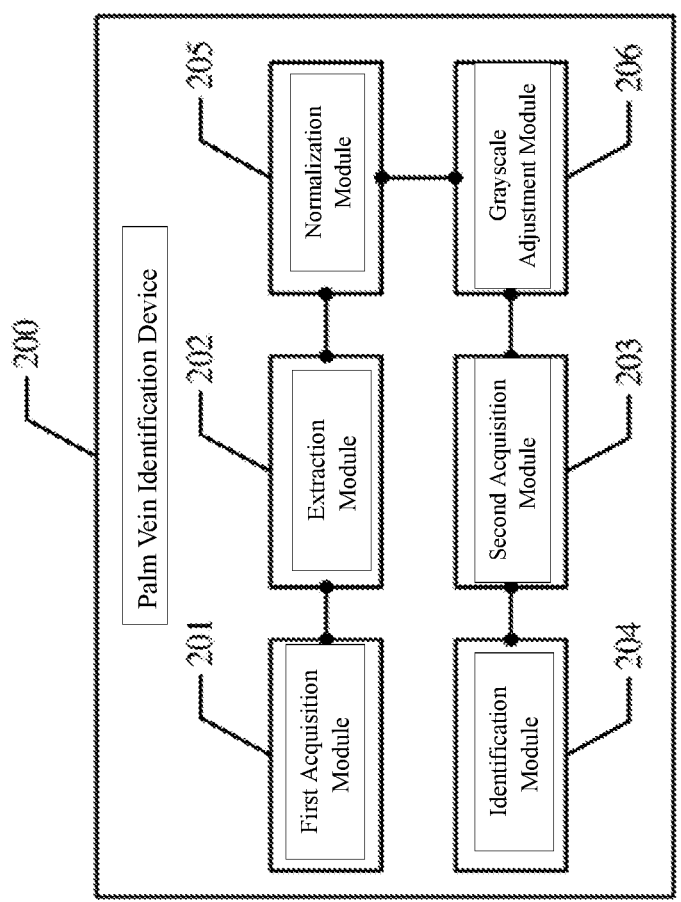
FIG. 10 illustrates a palm vein identification device in accordance with an embodiment of the present teachings.

FIG. 10 illustrates a palm vein identification device in accordance with an embodiment of the present teachings. Referring to FIG. 10, a palm vein identification device 200, in accordance with another embodiment of the present teachings, comprises: a first acquisition module 201 configured to acquire a target palm vein image of a user; an extraction module 202 configured to extract a region of interest (ROI) from the user's target palm vein image acquired by first acquisition module 201; a normalization module 205 configured to perform normalization processing on the ROI after the ROI is extracted by extraction module 202 from the target palm vein image of the user; a grayscale adjustment module 206 configured to adjust a grayscale of the ROI after normalization by normalization module 205 and further perform normalization processing on the ROI after grayscale adjustment; a second acquisition module 203 configured to acquire feature data corresponding to the ROI extracted by extraction module 202, wherein the feature data are obtained by filtering; and an identification module 204 configured to compare the feature data acquired by second acquisition module 203 corresponding to the target palm vein image against feature data corresponding to a registered original palm vein image to perform identification on the target palm vein image of the user, wherein the feature data corresponding to the registered original palm vein image are obtained by calculation in advance.

Further, in embodiments of the present teachings, a method for acquiring feature data is described, including: dividing an ROI into a plurality of image blocks; convolving each image block with a convolution window and obtaining a plurality of feature values, wherein the convolution window and the image block are equally sized; and finally acquiring the feature data after performing binarization processing on the plurality of feature values. If the speed and template space of the palm vein identification system are not greatly limited, more feature data (such as more frequencies and directions) are extracted so that the present solution has better identification effect. Further, in the present teachings, parameters including the size of ROI, frequency of filters, direction, and step length can be adjusted as required so as to improve practicability of the present solution.

Figure 11:
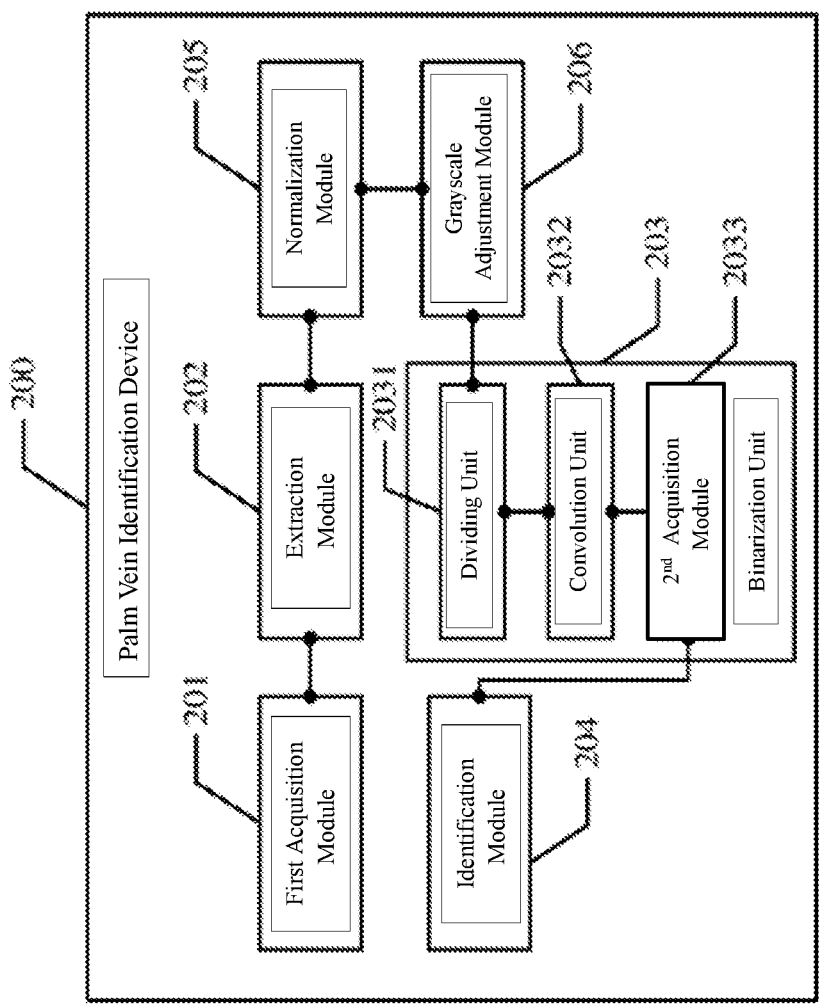
FIG. 11 illustrates a palm vein identification device in accordance with an embodiment of the present teachings.

FIG. 11 illustrates a palm vein identification device in accordance with an embodiment of the present teachings. Referring to FIG. 11, a palm vein identification device 200 in accordance with another embodiment of the present teachings comprises: a first acquisition module 201 configured to acquire a target palm vein image of a user; an extraction module 202 configured to extract a region of interest (ROI) from the user's target palm vein image acquired by first acquisition module 201; a normalization module 205 configured to perform normalization processing on the ROI after the ROI is extracted by extraction module 202 from the target palm vein image of the user; a grayscale adjustment module 206 configured to adjust a grayscale of the ROI after normalization by normalization module 205 and further perform normalization processing on the ROI after grayscale adjustment; a second acquisition module 203 configured to acquire feature data corresponding to the ROI extracted by extraction module 202, wherein the feature data are obtained by filtering; and an identification module 204 configured to compare the feature data acquired by second acquisition module 203 corresponding to the target palm vein image against feature data corresponding to a registered original palm vein image to perform identification on the target palm vein image of the user, wherein the feature data corresponding to the registered original palm vein image are obtained by calculation in advance.

Second acquisition module 203 comprises: a dividing unit 2031 configured to divide the ROI into a plurality of image blocks; a convolution unit 2032 configured to convolve each of the divided image blocks with a convolution window and obtain a plurality of feature values, wherein the convolution window and the image block are equally sized; and a binarization unit 2033 configured to acquire the feature data after performing binarization processing on the plurality of feature values obtained by convolution unit 2032.

Further, in embodiments of the present teachings, a method for acquiring feature data is described, including: dividing an ROI into a plurality of image blocks; convolving each image block with a convolution window and obtaining a plurality of feature values, wherein the convolution window and the image block are equally sized; and finally acquiring the feature data after performing binarization processing on the plurality of feature values. If the speed and template space of the palm vein identification system are not greatly limited, more feature data (such as more frequencies and directions) are extracted so that the present solution has better identification effect. Further, in the present teachings, parameters including the size of ROI, frequency of filters, direction, and step length can be adjusted as required so as to improve practicability of the present solution. Binarization processing of feature data also has the following benefits. First, it greatly reduces data volume. If 16 original 4-byte feature data are compressed to 2-byte data, it means the data volume is reduced to one-third of the original data volume. Second, binarization processing can increase the ability of identifying the data. The 2-byte feature data obtained after binarization processing are equivalent to a pattern feature, with a high capacity in expressing texture feature of palm vein.

Figure 12:
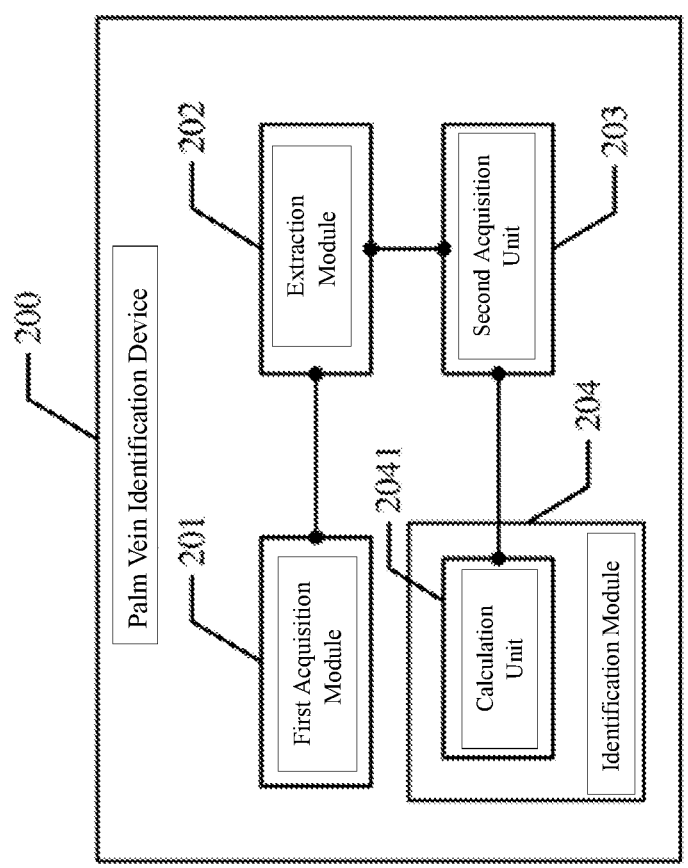
FIG. 12 illustrates a palm vein identification device in accordance with an embodiment of the present teachings.

FIG. 12 illustrates a palm vein identification device in accordance with an embodiment of the present teachings. Referring to FIG. 12, a palm vein identification device 200 in accordance with another embodiment of the present teachings comprises: a first acquisition module 201 configured to acquire a target palm vein image of a user; an extraction module 202 configured to extract a region of interest (ROI) from the user's target palm vein image acquired by first acquisition module 201; a second acquisition module 203 configured to acquire feature data corresponding to the ROI extracted by extraction module 202, wherein the feature data are obtained by filtering; and an identification module 204 configured to compare the feature data acquired by second acquisition module 203 corresponding to the target palm vein image against feature data corresponding to a registered original palm vein image to perform identification on the target palm vein image of the user, wherein the feature data corresponding to the registered original palm vein image are obtained by calculation in advance.

Identification module 204 comprises: a calculation unit 2041 configured to calculate a similarity between the feature data corresponding to the target palm vein image and the feature data corresponding to the registered palm vein image by using the following formula:

$$S(x_1, x_2) = \frac{F}{H(x_1, x_2)} + B.$$

Here, $x_1$ represents the feature data corresponding to the target palm vein image, $x_2$ represents the feature data corresponding to the registered palm vein image, $S(x_1, x_2)$ represents the similarity between the feature data corresponding to the target palm vein image and the feature data corresponding to the registered palm vein image, $H(x_1, x_2)$ represents a Hamming distance between $x_1$ and $x_2$, and F and B are constants.

Further, in embodiments, the present teachings provides a method for comparing target palm vein images against registered original palm vein images stored in a database so that the present solution is more practical. Using such similarity for identifying target palm vein images can increase identification effect of the present teachings.

Figure 13:
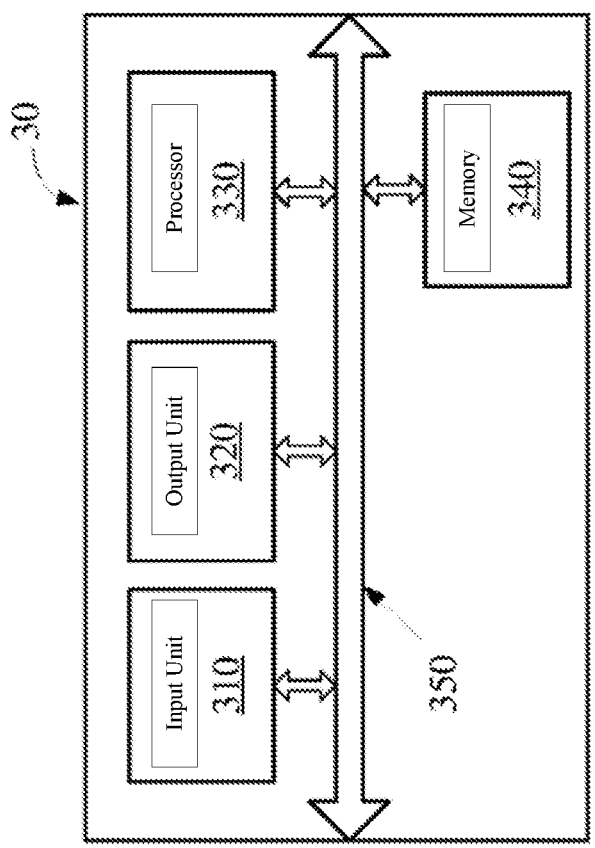
FIG. 13 is a structural diagram illustrating a palm vein identification device in accordance with an embodiment of the present teachings.

FIG. 13 is a structural diagram illustrating a palm vein identification device in accordance with an embodiment of the present teachings. Referring to FIG. 13, a palm vein identification device 30 in an embodiment of the present teachings is shown. Palm vein identification device 30 can comprise an input unit 310, an output unit 320, a processor 330, and a memory 340. In this embodiment, output unit 320 can be a display unit. Memory 340 can be a read-only memory or a random access memory, capable of providing instructions and data to processor 330. A portion of memory 340 can also be a non-volatile random access memory (NVRAM). Memory 340 can store the following elements: executable modules or data structures, or a subset thereof, or a set of extensions thereof: operating instructions: including various operating instructions for implementing various operations; operating systems: including various system programs for implementing various basic services and processing hardware-based tasks.

In embodiments of the present teachings, processor 330 is used for: acquiring a target palm vein image of a user; extracting a region of interest (ROI) from the target palm vein image of the user; acquiring feature data corresponding to the ROI, wherein the feature data are obtained by filtering followed by binarization processing; and comparing the feature data corresponding to the target palm vein image against feature data corresponding to a registered original palm vein image to perform identification on the target palm vein image of the user, wherein the feature data corresponding to the registered original palm vein image are obtained by calculation in advance.

Processor 330 controls operation of palm vein identification device 30. Processor 330 can also be a central processing unit (CPU). Memory 340 can be a read-only memory or a random access memory, capable of providing instructions and data to processor 330. A portion of memory 340 can also comprise an NVRAM. In practical applications, all modules of palm vein identification device 30 are coupled by a bus system 350. Bus system 350 comprises a data bus, a power bus, a control bus, and a status signal bus. For the clarity of illustration, various buses in the drawings are labeled as bus system 350.

The method disclosed in the above embodiments of the present teachings can be applied to processor 330 or implemented by processor 330. Processor 330 can be an integrated circuit chip capable of signal processing. During the implementation, the steps of the above method(s) can be implemented by integrated logic circuits of hardware in processor 330 or instructions in software form. Processor 330 can be a general purpose processor, a digital signal processor (DSP), an application specific integrated circuit (ASIC), a field-programmable gate array (FPGA), or other programmable logic device, discrete gate, transistor logic device, or discrete hardware component capable of implementing the methods, steps, and logic blocks disclosed in the embodiments of the present teachings. The general purpose processor can be a microprocessor, or the processor can be any conventional processor or the like. Steps of the method disclosed in the embodiments of the present teachings can be directly executed by a hardware decoding processor or by a combination of hardware and software modules in a decoding processor. The software module can be located in a known storage medium, such as a random access memory, a flash memory, a read-only memory, a programmable read-only memory, an electrically-erasable programmable memory, or a register. The storage medium is located in memory 340, and processor 330 reads information from memory 340 and completes the steps of the aforementioned methods in combination with the hardware.

Optionally, processor 330 is used for: acquiring 9 key points in the target palm vein image, wherein the 9 key points include a left end point connected with a largest crosswise palm line, a right end point connected with the largest crosswise palm line, a valley point between a thumb and an index finger, a valley point between the index finger and a middle finger, a valley point between the middle finger and a ring finger, a valley point between the ring finger and a little finger, a valley point between the little finger and the palm, a boundary point connected with the valley point between the index finger and the middle finger, and a boundary point connected with the valley point between the ring finger and the little finger; and determining the ROI by locating the 9 key points.

Optionally, processor 330 is used for: acquiring 7 key points in the target palm vein image or acquiring 5 key points in the target palm vein image; determining the ROI by locating the 7 key points or the 5 key points. Optionally, processor 330 is used for: performing normalization processing on the ROI; and adjusting a grayscale of the ROI and performing normalization processing on the ROI after grayscale adjustment. Optionally, processor 330 is used for: dividing the ROI into a plurality of image blocks; convolving each image block with a convolution window and obtaining a plurality of feature values, wherein the convolution window and the image block are equally sized; and acquiring the feature data after performing binarization processing on the plurality of feature values. Optionally, processor 330 is used for: calculating a similarity between the feature data corresponding to the target palm vein image and the feature data corresponding to the registered palm vein image by using the following formula:

$$S(x_1, x_2) = \frac{F}{H(x_1, x_2)} + B.$$

Here, $x_1$ represents the feature data corresponding to the target palm vein image, $x_2$ represents the feature data corresponding to the registered palm vein image, $S(x_1, x_2)$ represents the similarity between the feature data corresponding to the target palm vein image and the feature data corresponding to the registered palm vein image, $H(x_1, x_2)$ represents a Hamming distance between $x_1$ and $x_2$, and F and B are constants.

FIG. 13 can be understood with reference to the description of the method in FIG. 1 and is not detailed again herein. It will be apparent to those skilled in the art that, for the convenience and brevity of description, the specific operations of the systems, devices, and units described above can be understood by referring to the corresponding processes in the aforementioned embodiments and thus are not detailed again herein.

In the several embodiments provided in the present application, it should be understood that the disclosed system, device, and method can be implemented in other manners. For example, embodiments of the described device are merely exemplary. For example, the unit division is merely a logical function division and can be another division in actual implementation. For example, a plurality of units or components can be combined or integrated into another system, or some features can be ignored or not performed. In addition, the displayed or discussed mutual couplings or direct couplings or communication connections can be implemented through some interfaces. The indirect couplings or communication connections between the apparatuses or units can be implemented in electronic, mechanical, or other forms.

The units described as separate components may or may not be physically separated, and components displayed as units may or may not be physical units, that is, they may be located in one position, or they may also be distributed on a plurality of network elements. Some or all of the units can be selected according to actual needs to achieve the objectives of the solutions of the present embodiments.

In addition, various functional units in various embodiments of the present teachings could be integrated into one processing unit, or each of the units could also exist alone physically, or two or more units could be integrated into one unit. The integrated unit above could be implemented in the form of hardware or could also be implemented in the form of hardware with software functional units.

The integrated unit above implemented in the form of software functional units and sold or used as an independent product can be stored in a computer readable storage medium. Based on such an understanding, the technical solutions of the present teachings or the portion that contributes to prior art or all or part of the technical solutions can be embodied in the form of a software product. The software product is stored in a storage medium and includes several instructions for instructing a computer (such as a PC, a server, or a network device) to execute all or a part of the steps of the methods described in the embodiments of the present disclosure. The abovementioned storage medium includes any medium capable of storing program codes, such as a USB flash drive, a mobile hard drive, a read-only memory (ROM), a random access memory (RAM), a magnetic disk, or an optical disk.

The embodiments described above are illustrative, but not limiting. Those of ordinary skill in the art will appreciate that various improvements and modifications are possible without departing from the scope and spirit of the present teachings, and these improvements and modifications shall be deemed as protected by the scope of the present teachings.

What is claimed is:

1. A palm vein identification method, comprising:
   acquiring a target palm vein image of a user;
   extracting a region of interest (ROI) from the target palm vein image of the user;
   performing normalization processing on the ROI;
   adjusting a grayscale of the ROI and performing normalization processing on the ROI after grayscale adjustment;
   acquiring feature data corresponding to the ROI, wherein the feature data are obtained by filtering followed by binarization processing; and
   comparing the feature data corresponding to the target palm vein image against feature data corresponding to a registered original palm vein image to perform identification on the target palm vein image of the user, wherein the feature data corresponding to the registered original palm vein image are obtained by calculation in advance.

2. The method of claim 1, wherein, the step of extracting a region of interest (ROI) from the target palm vein image of the user comprises:
acquiring 9 key points in the target palm vein image, wherein the 9 key points include a left end point connected with a largest crosswise palm line, a right end point connected with the largest crosswise palm line, a valley point between a thumb and an index finger, a valley point between the index finger and a middle finger, a valley point between the middle finger and a ring finger, a valley point between the ring finger and a little finger, a valley point between the little finger and the palm, a boundary point connected with the valley point between the index finger and the middle finger, and a boundary point connected with the valley point between the ring finger and the little finger; and
determining the ROI by locating the 9 key points.

3. The method of claim 1, wherein, the step of extracting the region of interest (ROI) from the target palm vein image of the user comprises:
acquiring 7 key points in the target palm vein image or acquiring 5 key points in the target palm vein image; and
determining the ROI by locating the 7 key points or the 5 key points.

4. The method of claim 1, wherein, the step of comparing the feature data corresponding to the target palm vein image against feature data corresponding to the registered original palm vein image to perform identification on the target palm vein image of the user comprises:
calculating a similarity between the feature data corresponding to the target palm vein image and the feature data corresponding to the registered palm vein image by using the following formula:

$$S(x_1, x_2) = \frac{F}{H(x_1, x_2)} + B$$

wherein: $x_1$ represents the feature data corresponding to the target palm vein image, $x_2$ represents the feature data corresponding to the registered palm vein image, $S(x_1, x_2)$ represents the similarity between the feature data corresponding to the target palm vein image and the feature data corresponding to the registered palm vein image, $H(x_1, x_2)$ represents a Hamming distance between $x_1$ and $x_2$, and F and B are constants.

5. The method of claim 1, wherein, the step of acquiring the feature data corresponding to the ROI comprises:
dividing the ROI into a plurality of image blocks;
convolving each image block with a convolution window and obtaining a plurality of feature values, wherein the convolution window and the image block are equally sized; and
acquiring the feature data after performing binarization processing on the plurality of feature values.

6. A palm vein identification device, comprising:
a first acquisition module, configured to acquire a target palm vein image of a user;
an extraction module, configured to
extract a region of interest (ROI) from the user's target palm vein image acquired by the first acquisition module,
perform normalization processing on the ROI, and
adjust a grayscale of the ROI and performing normalization processing on the ROI after grayscale adjustment;
a second acquisition module, configured to acquire feature data corresponding to the ROI extracted by the extraction module, wherein the feature data are obtained by filtering followed by binarization processing; and
an identification module, configured to compare the feature data acquired by the second acquisition module corresponding to the target palm vein image against feature data corresponding to a registered original palm vein image to perform identification on the target palm vein image of the user, wherein the feature data corresponding to the registered original palm vein image are obtained by calculation in advance.

7. The palm vein identification device of claim 6, wherein the identification module comprises:
a calculation unit, configured to calculate a similarity between the feature data corresponding to the target palm vein image and the feature data corresponding to the registered palm vein image by using the following formula:

$$S(x_1, x_2) = \frac{F}{H(x_1, x_2)} + B$$

wherein: $x_1$ represents the feature data corresponding to the target palm vein image, $x_2$ represents the feature data corresponding to the registered palm vein image, $S(x_1, x_2)$ represents the similarity between the feature data corresponding to the target palm vein image and the feature data corresponding to the registered palm vein image, $H(x_1, x_2)$ represents a Hamming distance between $x_1$ and $x_2$, and F and B are constants.

8. The palm vein identification device of claim 6, wherein the extraction module comprises:
a first acquisition unit, configured to acquire 9 key points in the target palm vein image, wherein the 9 key points include a left end point connected with a largest crosswise palm line, a right end point connected with the largest crosswise palm line, a valley point between a thumb and an index finger, a valley point between the index finger and a middle finger, a valley point between the middle finger and a ring finger, a valley point between the ring finger and a little finger, a valley point between the little finger and the palm, a boundary point connected with the valley point between the index finger and the middle finger, and a boundary point connected with the valley point between the ring finger and the little finger; and
a first locating unit, configured to determine the ROI by locating the 9 key points acquired by the first acquisition unit.

9. The palm vein identification device of claim 6, wherein the extraction module comprises:
a second acquisition unit, configured to acquire 7 key points in the target palm vein image or acquire 5 key points in the target palm vein image; and a second locating unit, configured to determine the ROI by locating the 7 key points or the 5 key points acquired by the second acquisition unit.

10. The palm vein identification device of claim 6, wherein the second acquisition module comprises:
    a dividing unit, configured to divide the ROI into a plurality of image blocks;
    a convolution unit, configured to convolve each of the divided image blocks with a convolution window and obtain a plurality of feature values, wherein the convolution window and the image block are equally sized; and
    a binarization unit, configured to acquire the feature data after performing binarization processing on the plurality of feature values obtained by the convolution unit.

11. A palm vein identification device, comprising:
    a processor and a memory;
    wherein the memory is configured to store a program;
    wherein the processor is configured to execute the program in the memory so that the palm vein identification device is configured to:
    acquire a target palm vein image of a user;
    extract a region of interest (ROI) from the target palm vein image of the user;
    perform normalization processing on the ROI;
    adjust a grayscale of the ROI and performing normalization processing on the ROI after grayscale adjustment;
    acquire feature data corresponding to the ROI, wherein the feature data are obtained by filtering followed by binarization processing; and
    compare the feature data corresponding to the target palm vein image against feature data corresponding to a registered original palm vein image to perform identification on the target palm vein image of the user, wherein the feature data corresponding to the registered original palm vein image are obtained by calculation in advance.

12. A non-transitory storage medium for storing one or more programs, wherein the one or more programs comprise an instruction so that when the instruction is executed by a palm vein identification device comprising one or more processors, the palm vein identification device is configured to:
    acquire a target palm vein image of a user;
    extract a region of interest (ROI) from the target palm vein image of the user;
    acquire feature data corresponding to the ROI, wherein the feature data are obtained by filtering followed by binarization processing; and
    compare the feature data corresponding to the target palm vein image against feature data corresponding to a registered original palm vein image to perform identification on the target palm vein image of the user, wherein the feature data corresponding to the registered original palm vein image are obtained by calculation in advance.

* * * * *